Patented Apr. 1, 1924.

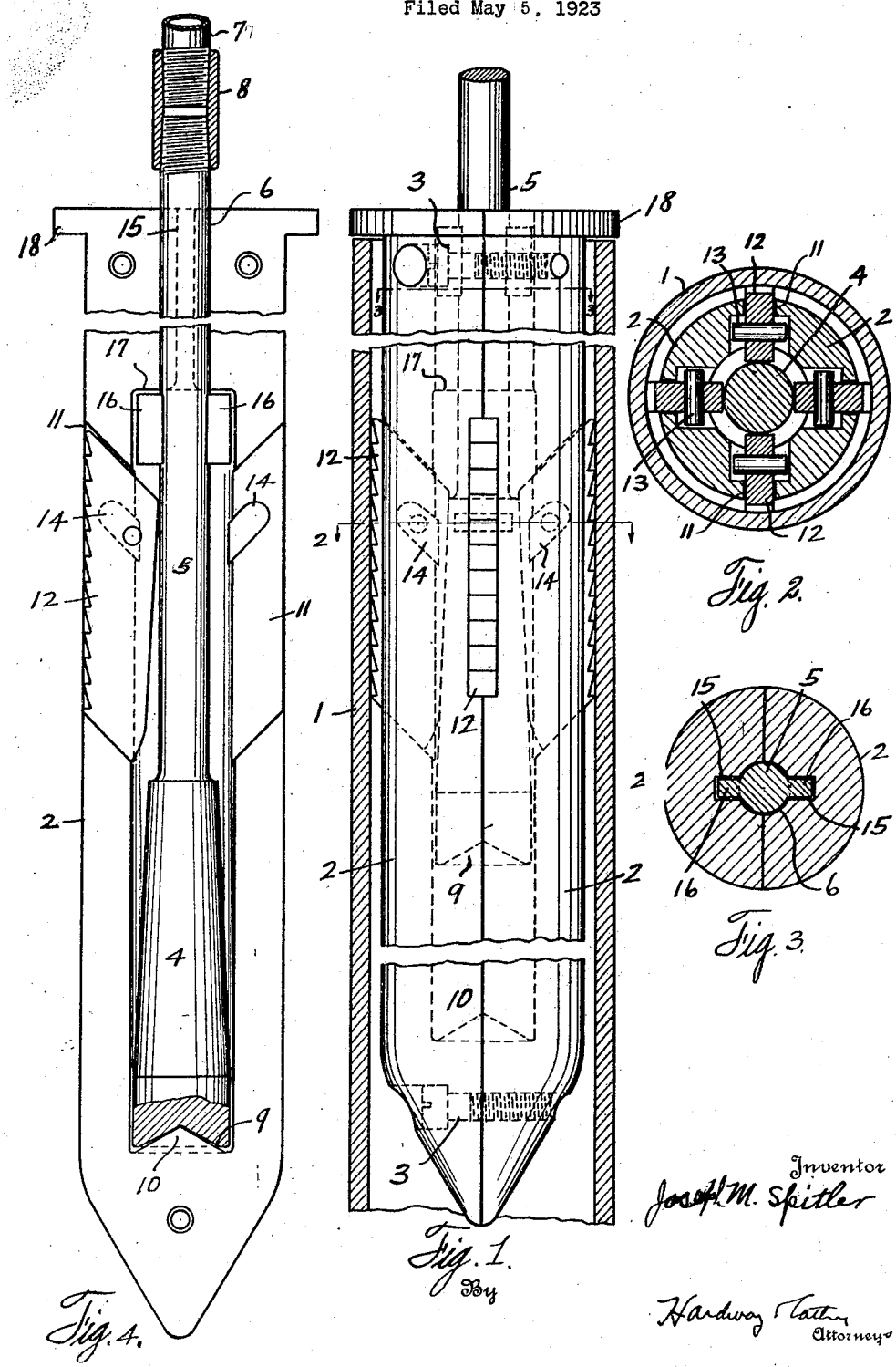

1,488,716

UNITED STATES PATENT OFFICE.

JOSEPH M. SPITLER, OF HOUSTON, TEXAS.

SPEAR.

Application filed May 5, 1923. Serial No. 636,949.

*To all whom it may concern:*

Be it known that I, JOSEPH M. SPITLER, citizen of the United States, residing at Houston, in the county of Harris and State of Texas, have invented certain new and useful Improvements in Spears, of which the following is a specification.

This invention relates to new and useful improvements in a spear.

One object of the invention is to provide a device of the character described specially adapted for use in pulling stuck pipe from a bore.

Another object of the invention is to provide a spear which may be released and withdrawn in case the pipe can not be pulled.

With the above and other objects in view the invention has particular relation to certain novel features of construction, operation and arrangement of parts, an example of which is given in this specification and illustrated in the accompanying drawings, wherein:—

Figure 1 shows a side view of the spear within a pipe and in engagement therewith.

Figure 2 shows a transverse sectional view taken on the line 2—2 of Figure 1.

Figure 3 shows a transverse sectional view taken on the line 3—3 of Figure 1, and Figure 4 shows a side view of one section of the spear showing also the mandrel therein.

In the drawings the numeral 1 designates the pipe to be pulled, the numerals 2, 2 designate the sections of the spear body, which, when fitted together, are secured as a unit by means of the upper and lower set bolts 3, 3. The body is formed of two sections, as shown, for convenience in construction. The numeral 4 designates a downwardly flared mandrel which is formed with a reduced stem 5, said stem working through the bearing 6 in the upper end of the body and being connected to an operating pipe, or tubing 7, by means of the coupling 8. The spear body is hollow as shown, and its lower end is pointed so as to readily enter pipe. The mandrel has a free lengthwise movement within said body and its lower end is concaved as at 9, and when in lower position rests upon the conical shaped bearing 10. The spear body has the radiating upwardly inclined jaw bearings 11 in which the jaws 12 work, the upper and lower ends of said jaws being inclined to correspond with the bearings in which they work. Each jaw has a transverse bearing pin 13 whose ends project and work in the side grooves 14 in said body. The bearing 6 has oppositely disposed grooves 15, 15 and the shank 5 carries oppositely disposed keys 16, 16.

When the device is assembled for letting it down into the bore the stem 5 is turned so that the keys 16 will engage against the annular shoulder 17 of the body and sustain the weight of said body while the same is being lowered into the bore. When the spear enters the pipe the extended annular flange 18 carried by the upper end of the body will engage against the upper end of said pipe. The stem may then be turned until the keys 16 align with the grooves 15, the mandrel 4 turning on the bearing 10. An upward pull is then exerted through the pipe 7 and the keys 16 will pass up through the grooves 15 and the mandrel 4 will spread the jaws 12 into engagement with the pipe. If the pipe 1 can not be pulled the mandrel is then lowered to release the jaws from the pipe and the stem 5 is then given a partial turn to carry the keys 16 out of alignment with the grooves 15, and the entire spear may then be withdrawn by an upward pull.

What I claim is:—

1. A spear including a body having radial slots, jaws movable in said slots and mounted on inwardly inclined bearings, a flared mandrel within said body movable in one direction into engagement with said jaws to expand them and in the other direction to release said jaws, and means for locking said mandrel in said last mentioned position.

2. A spear including a tubular body having radial slots, jaws movable in said slots, means within said body movable in one direction into engagement with said jaws to expand them and in the other direction to release the jaws, said jaws being mounted to contract by gravity when released, and a locking device arranged to lock said means in the last mentioned position.

3. A spear including a tubular body having a reduced bearing at its upper end and provided with side slots beneath said bearing, jaws movable in said slots, a mandrel in said body whose upper end is formed into a stem which works through said bearing, said mandrel when moved into one position operating to expand the jaws and when moved into another position releasing said jaws, a bearing for each jaw, permitting the jaw to move inwardly when released, and a device for locking said mandrel in said last named position.

4. A spear including a tubular body having a reduced bearing at its upper end and provided with side slots beneath said bearing said bearing being formed with a vertical key-way, jaws movable in said slots, a mandrel in said body whose upper end is formed into a stem which works through said bearing, said mandrel when moved into one position operating to expand the jaws and when moved into another position releasing said jaws, and a device for locking said mandrel in said last named position, said device including a key carried by said stem and adapted to work into and out of said keyway.

5. A spear including a tubular body having a reduced bearing at its upper end and provided with side slots beneath said bearing, jaws movable in said slots, a mandrel in said body whose upper end is formed into a stem which works through said bearing, said mandrel when moved into one position operating to expand the jaws and when moved into another position releasing said jaws, and a device for locking said mandrel in said last named position, said device including interengaging means carried by said body and stem respectively, said interengaging means consisting of a key carried by one of said members, the other member having a vertical key-way in which the key is adapted to work, said means, being releasable by rotating the stem relative to the body.

6. A spear including a tubular body having radial slots being formed with inwardly inclined bearings, jaws mounted on said bearings, and movable in said slots, means within said body, movable in one direction into engagement with said jaws to expand them, and in the other direction to release the jaws, and a locking device arranged to lock said means in the last mentioned position.

7. A spear including a tubular body having radial slots, radially movable jaws in said slots, bearings sustaining said jaws, a mandrel within said body movable in one direction into engagement with said jaws to expand them, and in the other direction to release the jaws, said bearings being formed to move the jaws inwardly when released, a locking device arranged to lock said mandrel in the last mentioned position.

8. A spear including a tubular body having radial slots, an outwardly projecting shoulder on said body, jaws movable in said slots, a mandrel within the body, movable in one direction into engagement with said jaws to expand them, and in the other direction to release the jaws, downwardly and inwardly inclined bearings sustaining the jaws and a locking device arranged to lock said mandrel in the last mentioned jaws.

9. A spear including a tubular body having a reduced bearing in its upper end forming an internal annular shoulder, said bearing having a vertical key-way, and said body being provided with slots beneath the bearing, jaws movable in said slots a mandrel in said body whose upper end is formed into a stem which works through said bearing, a key carried by said stem adapted to work in said key-way in one position, and to engage under said shoulder when in another position, said mandrel, when moved into one position operating to expand the jaws and when moved into another position releasing said jaws, said key, when in engagement with said shoulder, operating to lock the mandrel in said last named position.

In testimony whereof I have signed my name to this specification in the presence of two subscribing witnesses.

JOSEPH M. SPITLER.

Witnesses:
E. V. HARDWAY,
JAS. W. OLIVER.